(12) United States Patent
Kirschner et al.

(10) Patent No.: US 7,775,152 B2
(45) Date of Patent: Aug. 17, 2010

(54) PORTAFILTER SYSTEM FOR USE WITH A RIGID POD

(75) Inventors: Jonathan Kirschner, Powder Springs, GA (US); Neil Saunders, Champaign, IL (US)

(73) Assignee: The Coca-Cola Company, Atlanta, GA (US)

( * ) Notice: Subject to any disclaimer, the term of this patent is extended or adjusted under 35 U.S.C. 154(b) by 775 days.

(21) Appl. No.: 11/160,531

(22) Filed: Jun. 28, 2005

(65) Prior Publication Data

US 2006/0288875 A1 Dec. 28, 2006

(51) Int. Cl.
*A47J 31/00* (2006.01)
(52) U.S. Cl. .......................... 99/295; 99/302 R; 99/323
(58) Field of Classification Search ............... 99/295, 99/302 R, 323; 426/77, 82, 112, 115
See application file for complete search history.

(56) References Cited

U.S. PATENT DOCUMENTS

| | | | | |
|---|---|---|---|---|
| 2,451,195 A | * | 10/1948 | Brown | 99/295 |
| 3,561,349 A | * | 2/1971 | Endo et al. | 99/307 |
| 3,975,996 A | * | 8/1976 | Vitous | 99/295 |
| 5,197,374 A | * | 3/1993 | Fond | 99/295 |
| 5,398,596 A | * | 3/1995 | Fond | 99/295 |
| 5,634,394 A | * | 6/1997 | Cortese | 99/295 |
| 6,786,134 B2 | | 9/2004 | Green | 99/289 P |
| 2002/0078831 A1 | | 6/2002 | Cai | |
| 2005/0016383 A1 | | 1/2005 | Kirschner et al. | 99/279 |
| 2005/0183581 A1 | | 8/2005 | Kirschner et al. | 99/295 |

FOREIGN PATENT DOCUMENTS

| | | |
|---|---|---|
| CH | 458099 | 6/1968 |
| EP | 0521397 B1 | 1/1993 |
| EP | 0891734 B1 | 1/1999 |
| EP | 1092376 | 4/2001 |
| EP | 1580144 B1 | 9/2005 |
| EP | 1710172 B1 | 10/2006 |
| EP | 1731063 B1 | 12/2006 |
| FR | 757358 | 12/1933 |
| WO | 9743937 | 11/1997 |
| WO | 03059778 A2 | 7/2003 |

OTHER PUBLICATIONS

International Preliminary Report on Patentability mailed for PCT/US2006/012476 on Aug. 29, 2007.
Examination Report for European Patent Application No. 06740484.8 dated May 19, 2008.
Examination Report and English translation of Examination Report for Chinese Patent Application No. 200680022799.8 dated Jun. 23, 2009.
Examination Report for European Patent Application No. 06740484.8 dated Jul. 13, 2009.

* cited by examiner

*Primary Examiner*—Reginald L Alexander
(74) *Attorney, Agent, or Firm*—Sutherland Asbill & Brennan LLP

(57) ABSTRACT

A portafilter system for use with a rigid pod. The portafilter may include a handle and a cup connected to the handle. The cup may include an aperture for positioning the rigid pod therein.

12 Claims, 4 Drawing Sheets

PORTAFILTER SYSTEM FOR USE WITH A RIGID POD

TECHNICAL FIELD

The present invention relates generally to brewing or mixing devices and more particularly relates to portafilters for use with an espresso machine or similar types of devices.

BACKGROUND OF THE INVENTION

Making a good cup of espresso is often considered an art form. In addition to a powerful taste, a good cup of espresso generally has a layer of crema. Crema is the golden foam that should cover the top of the espresso. Several variables must be controlled to produce a good cup of espresso. These variables include the nature of the grind, the tamp pressure, the brewing temperature, the pressure, and the time.

Several types of portafilters are used today with espresso machines. Commercial portafilters may be made out of heavy chrome plated brass or similar types of materials. To use such a portafilter, an amount of coffee grinds is placed in the filter. The grinds then must be tamped down with an appropriate amount of pressure. The greater the tamp pressure and the finer the coffee grind, the greater the resistance to the water flow therethrough. Too little resistance provides a weak beverage with little crema. Likewise, too much resistance may cause an over-extraction and again little to no crema. Although opinions differ, many coffee lovers believe that the commercial portafilters provide the best beverage if done correctly. Drawbacks, however, include the use of an inadequate tamp pressure and the necessity to clean the portafilter.

Other types of known portafilters include pressurized portafilters. These pressurized portafilters only require the use of a light tamp because the espresso machine will only allow the water to pass therethrough when the appropriate pressure has been developed. These portafilters, however, also need to be cleaned regularly.

Finally, pod portafilters are also known. These pod portafilters use coffee grinds that are prepackaged in sealed filter paper. The pods are simply placed in the portafilter. The quality of the beverage, however, may not be adequate because of the aspect ratio of the pod and/or the nature of the filter paper. The aspect ratio may be too thin, i.e., the pod may be too thin compared to its diameter such that the water passes through the grinds too quickly. Further, the filter paper may not have a consistent resistance. The water may tend to travel through the paper and around the grinds rather than through the grinds themselves. These pod portafilters generally require less cleanup than the commercial or the pressurized portafilters, but the portafilter itself still must be cleaned.

There is a desire, therefore, for a portafilter that includes the ease of use found in pod portafilters while providing the superior coffee offered by a commercial portafilter. The portafilter should be easy to use and require little to no cleaning.

SUMMARY OF THE INVENTION

The present application thus describes a portafilter system for use with a rigid pod. The portafilter may include a handle and a cup connected to the handle. The cup may include an aperture for positioning the rigid pod therein.

The portafilter system further may include a pod insert for mating with the rigid pod. The pod insert may include an outer lead for aligning the rigid pod therein and a ridge for sealing the rigid pod therein. The cup may include a plurality of mating elements thereon. The aperture may include a central aperture.

The present application further may describe an espresso machine for using a rigid pod. The espresso machine may include a handle adapter and a portafilter for positioning within the handle adapter. The portafilter may include a cup with an aperture therein. The aperture may be sized to accommodate the rigid pod.

The espresso machine further may include a pod insert for mating with the rigid pod. The pod insert may include a ridge for sealing the rigid pod therein. The aperture may include a central aperture.

The present application further may describe an espresso machine. The espresso machine may include a handle adapter and a portafilter for positioning within the handle adapter. The portafilter may include a cup with an aperture therein. A rigid pod may be sized to accommodate the aperture.

The espresso machine further may include a pod insert for mating with the rigid pod. The pod insert may include a ridge for sealing the rigid pod therein. The rigid pod may include a lid and a measure of coffee grinds therein and the coffee grinds may be tamped down by the lid. The rigid pod may include a lip and the rigid pod may be supported within the aperture of the cup only by the lip.

These and other features of the present invention will become apparent upon review of the following detailed description when taken in conjunction with the drawings and the appended claims.

DETAILED DESCRIPTION

Figure 1:
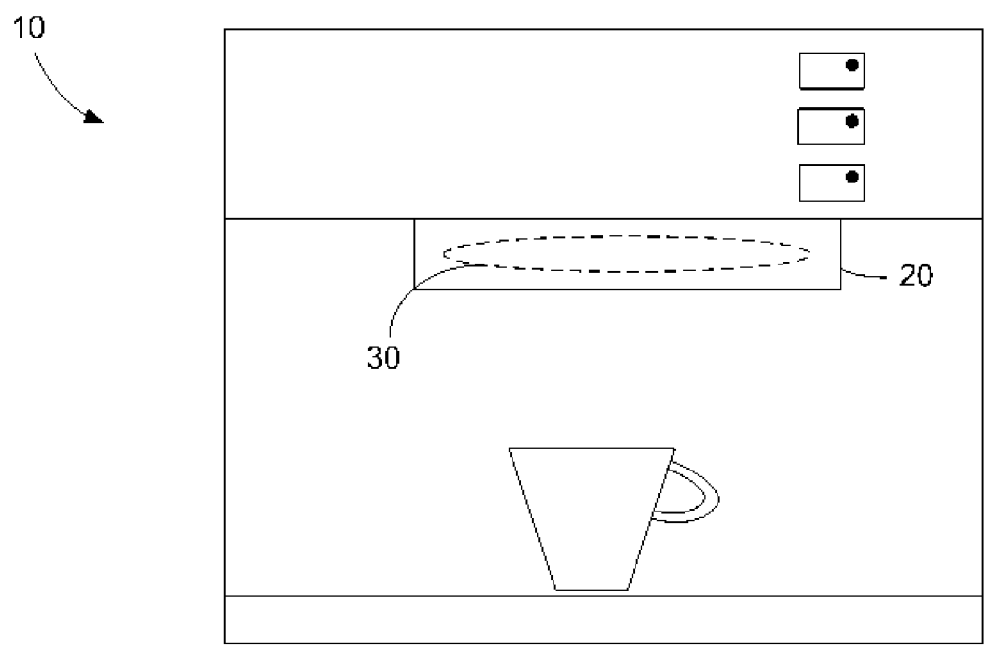
FIG. 1 is a front plan view of an espresso machine.
Figure 2:
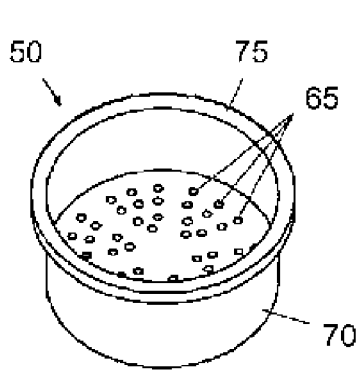
FIG. 2 is a perspective view of a rigid pod that may be used herein.
Figure 3:
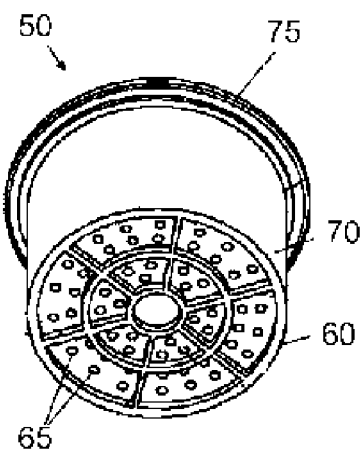
FIG. 3 is a bottom perspective view of the rigid pod of FIG. 2.
Figure 4:
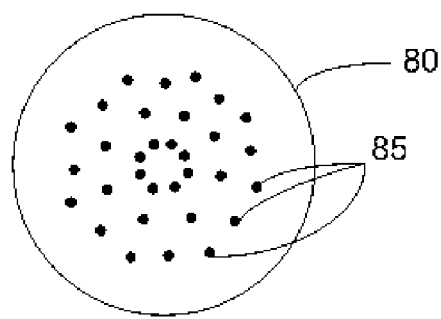
FIG. 4 is a top plan view of a lid to be used with the pod of FIG. 2.
Figure 5:
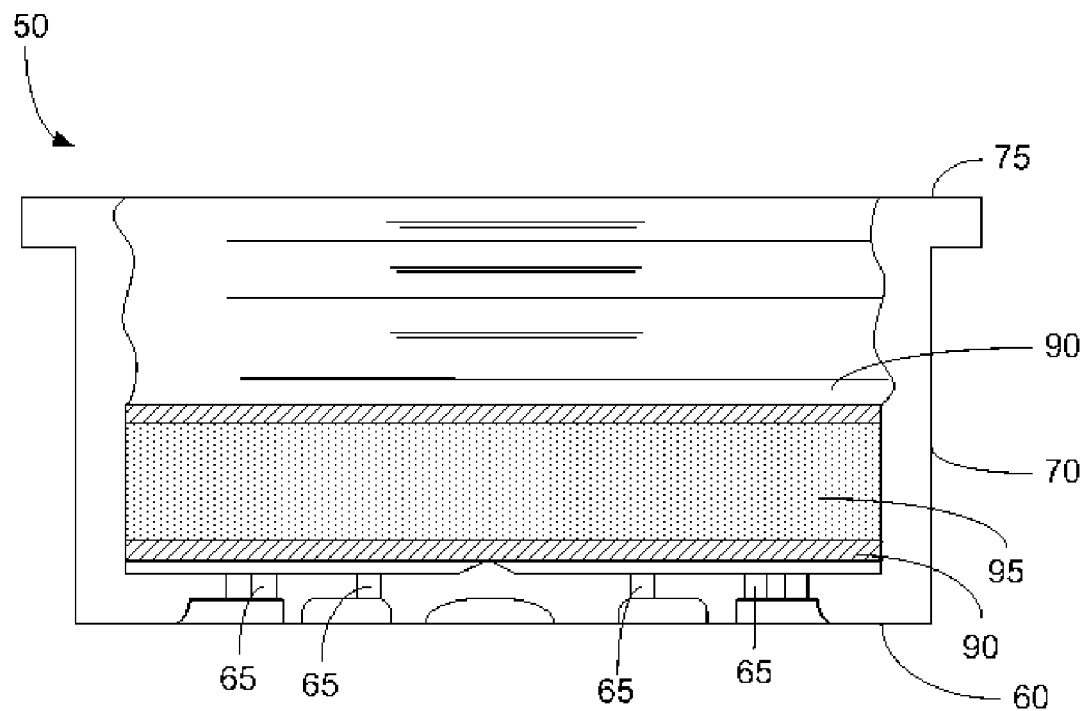
FIG. 5 is a side cross-sectional view of the rigid pod with brewing material therein.

Referring now to the drawings, in which like numerals indicate like elements throughout the several views, FIG. 1 shows an espresso machine 10 that may be used herein. The espresso machine 10 may be of conventional design. For example, the espresso machine 10 may be a commercial model made by ECM, Expobar, La Valentina, Pasquini, Salvatore, and similar types of devices. Other known machines 10 may be made by Jura, Gaggia, Saceo, Capresso, Solis, Francis, Isomac, and others.

The espresso machine 10 generally may include a boiler with a heating element and may provide predetermined volumes of fluid at a given temperature and pressure. The espresso machine 10 may include a handle adapter 20 that mates with a conventional portafilter so as to lock the portafilter in place. The handle adapter 20 and the portafilter may use mating male and female members to lock the portafilter in place. In order to adapt the espresso machine 10 for use herein (depending upon the model), a circular shower screen 30, generally positioned just above the handle adapter 20, may be removed.

Instead of tamping the coffee grinds down within the conventional portafilter and/or using the filter paper pods as described above, the device as described herein may use substantially rigid pods 50. The pods 50 may be similar to those shown in commonly owned U.S. Pat. No. 6,786,134 to Green, entitled "COFFEE AND TEA DISPENSER"; commonly owned U.S. patent application Ser. No. 10/604,405 to Kirschner, et al., entitled "COFFEE AND TEA POD"; and/or U.S. patent application Ser. No. 10/908,350 to Kirschner, et al.; entitled "COFFEE AND TEA POD," each of which are incorporated herein by reference.

As is shown in FIGS. 2-5, the pod 50 may have a base 60 with a number of apertures 65 positioned therein, a substantially circular sidewall 70, and surrounded by a lip 75. A lid 80 with a number of apertures 85 may enclose the pod 50 therein. One or more layers of a filter paper 90 may be placed about the base 60 and/or the lid 80. A predetermined amount of coffee grinds 95 may be positioned within the pod 50 and tamped down by the placement of the lid 80 therein. The lid 80 may be substantially concaved in shape. This description is for the purpose of example only in that the pod 50 may take any desired size or shape.

Figure 6:
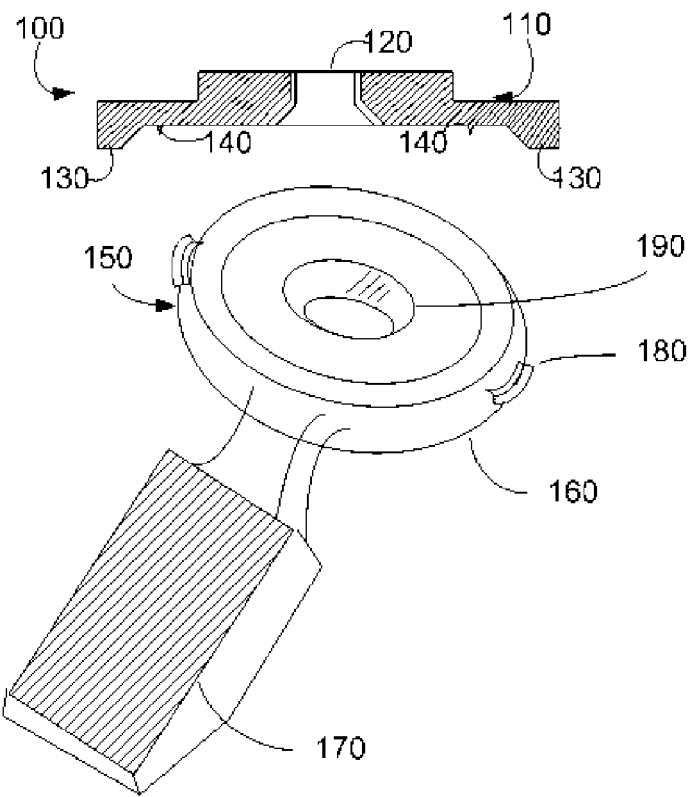
FIG. 6 is a perspective view of a portafilter system with a portafilter and a pod insert.
Figure 7:
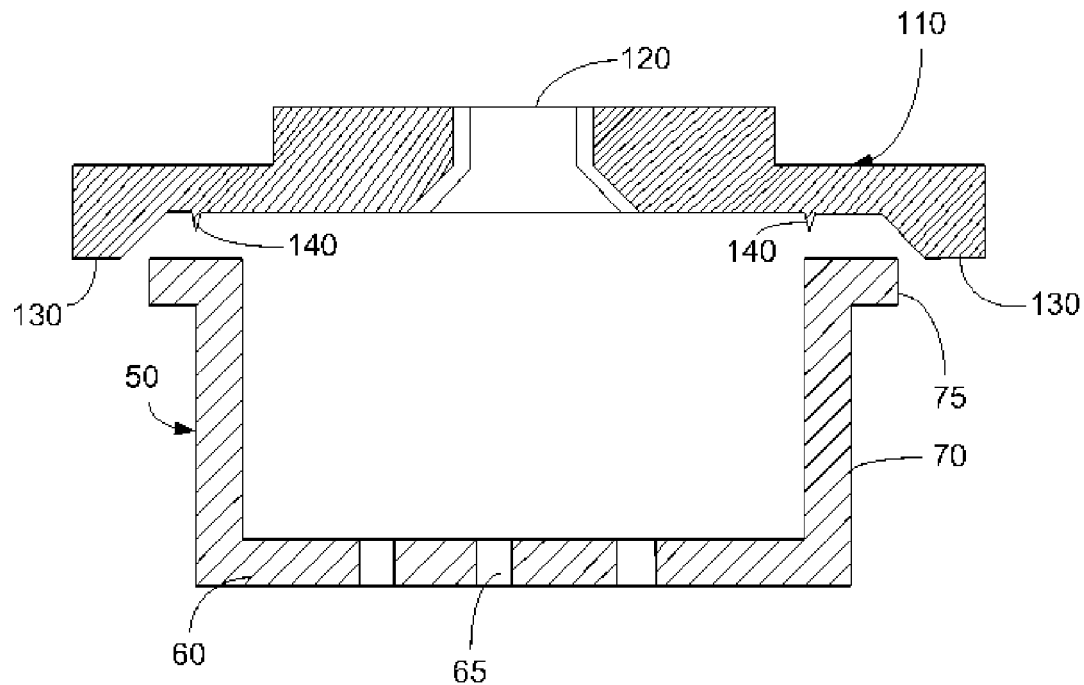
FIG. 7 is a side cross-sectional view of a pod insert and a pod.
Figure 8:
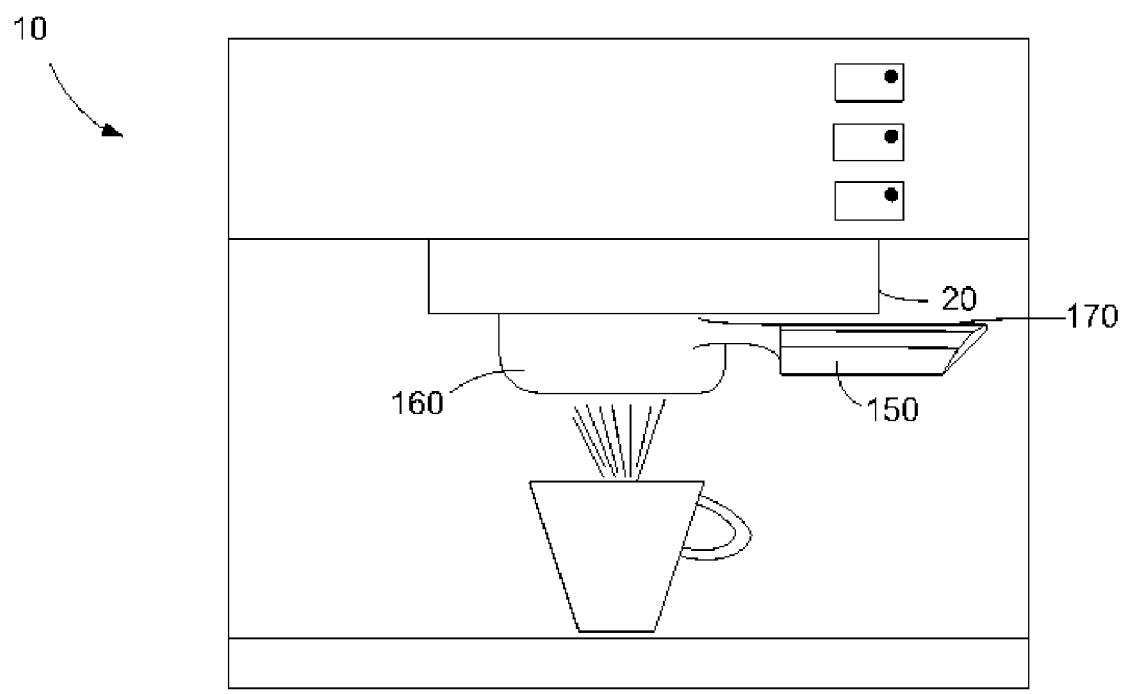
FIG. 8 is a front plan view of an espresso machine with an example of the portafilter installed.

FIGS. 6-8 show an improved portafilter system 100 as is described herein. The portafilter system 100 may include a pod insert 110. The pod insert 110 may be largely circular in shape and may be sized so as to replace the shower screen 30 in the espresso machine 10. Any shape and size, however, may be used. The pod insert 110 may be positioned within the handle adapter 20 and secured by conventional means. The pod insert 110 may be made out of brass, aluminum, stainless steel, plastics, or other types of substantially rigid materials.

The pod insert 110 may have one or more internal apertures 120 for the flow of water therethrough. Any number of apertures 120 may be used herein. The pod insert 110 also may include an outer lead 130. The outer lead 130 may be positioned about the perimeter of the pod insert 110 and may be angled so as to align the pod 50 therein. The pod insert 110 also may include a ridge 140 slightly inbound of the outer lead 130. The ridge 140 may be somewhat sharp so as to penetrate the lip 75 of the pod 50 and seal the pod 50 in place.

The pod portafilter system 110 also includes a portafilter 150. The portafilter 150 may be similar to the conventional portafilter in that it has a cup 160, a handle arm 170, and mating elements 180 positioned thereon. The portafilter 150 may have any desired size or shape. The portafilter 150 further may have an aperture 190 positioned within the base of the cup 160. The aperture 190 may be sized to permit a pod 50 or a similar structure to be positioned therein. The lip 75 of the pod 50 may rest upon the base of the cup 160. The portafilter 150 may be made out of chrome plated brass, aluminum, stainless steel, plastics, or other types of substantially rigid materials.

In use, the pod 50 may be placed within the aperture 190 of the cup 160 of the portafilter 150. The portafilter 150 is then positioned about the pod insert 110 and the mating elements 180 are aligned within the handle adapter 20 of the espresso machine 10. The lip 75 of the pod 50 is positioned within the pod insert 110 via the outer lead 130. The ridge 140 may penetrate the lip 75 of the pod 50 so as to seal the pod 50 in place. The espresso machine 10 then may be activated such that water flows through the pod 50 so as to make a shot of espresso or any other type of beverage.

Once complete, the portafilter 150 may be removed from the espresso machine 10. The pod 50 then may be removed in its entirety from the portafilter 150. Because all of the water flow is through the pod 50 itself, there is little or no cleanup required for the espresso machine 10 or the portafilter system 100 as a whole.

It should be apparent to one of ordinary skill in the art that the foregoing relates only to the preferred embodiments of the present invention and that numerous changes and modifications may be made herein without departing from the general spirit and scope of the invention as defined by the following claims and the equivalents thereof.

What is claimed is:

1. An espresso machine, comprising:
   a handle adapter;
   a portafilter for positioning within the handle adapter;
   the portafilter comprising a cup with a bore formed completely through the cup in a vertical direction; and
   a rigid pod comprising a plurality of pod apertures;
   the rigid pod narrow enough in a lateral direction to fit within the bore such that fluid may pass through the rigid pod without touching the cup,
   wherein the rigid pod comprises a lip, and wherein the lip is adapted to support the rigid pod within the bore.

2. The espresso machine of claim 1, further comprising a pod insert for mating with the rigid pod.

3. The espresso machine of claim 2, wherein the pod insert comprises an outer lead for aligning the rigid pod therein.

4. The espresso machine of claim 2, wherein the pod insert comprises a ridge for sealing the rigid pod therein.

5. The espresso machine of claim 1, wherein the cup comprises a plurality of mating elements thereon.

6. The espresso machine of claim 1, wherein the bore comprises a central bore.

7. The espresso machine of claim 1, wherein the rigid pod comprises a lid and a measure of coffee grinds therein and wherein the coffee grinds are tamped down by the lid.

8. The espresso machine of claim 1, wherein the bore comprises an upper opening sized for suspending the rigid pod therein and a lower opening sized at least as wide as the rigid pod such that fluid may pass through the rigid pod without touching the cup.

9. An espresso machine, comprising:
   a handle adapter;
   a portafilter for positioning within the handle adapter;
   the portafilter comprising a cup with a bore formed completely through the cup in a vertical direction; and
   a rigid pod comprising a plurality of pod apertures;
   the rigid pod narrow enough in a lateral direction to fit within the bore such that fluid may pass through the rigid pod without touching the cup,
   wherein the rigid pod comprises a lid and a measure of coffee grinds therein and wherein the coffee grinds are tamped down by the lid.

10. The espresso machine of claim 9, wherein the bore comprises a central bore.

11. The espresso machine of claim 9, further comprising a pod insert for mating with the rigid pod.

12. The espresso machine of claim 11, wherein the pod insert comprises a ridge for sealing the rigid pod therein.

* * * * *